March 26, 1957
E. G. ANGER ET AL
2,786,975
MOTOR CONTROL SYSTEMS
Filed Nov. 2, 1954
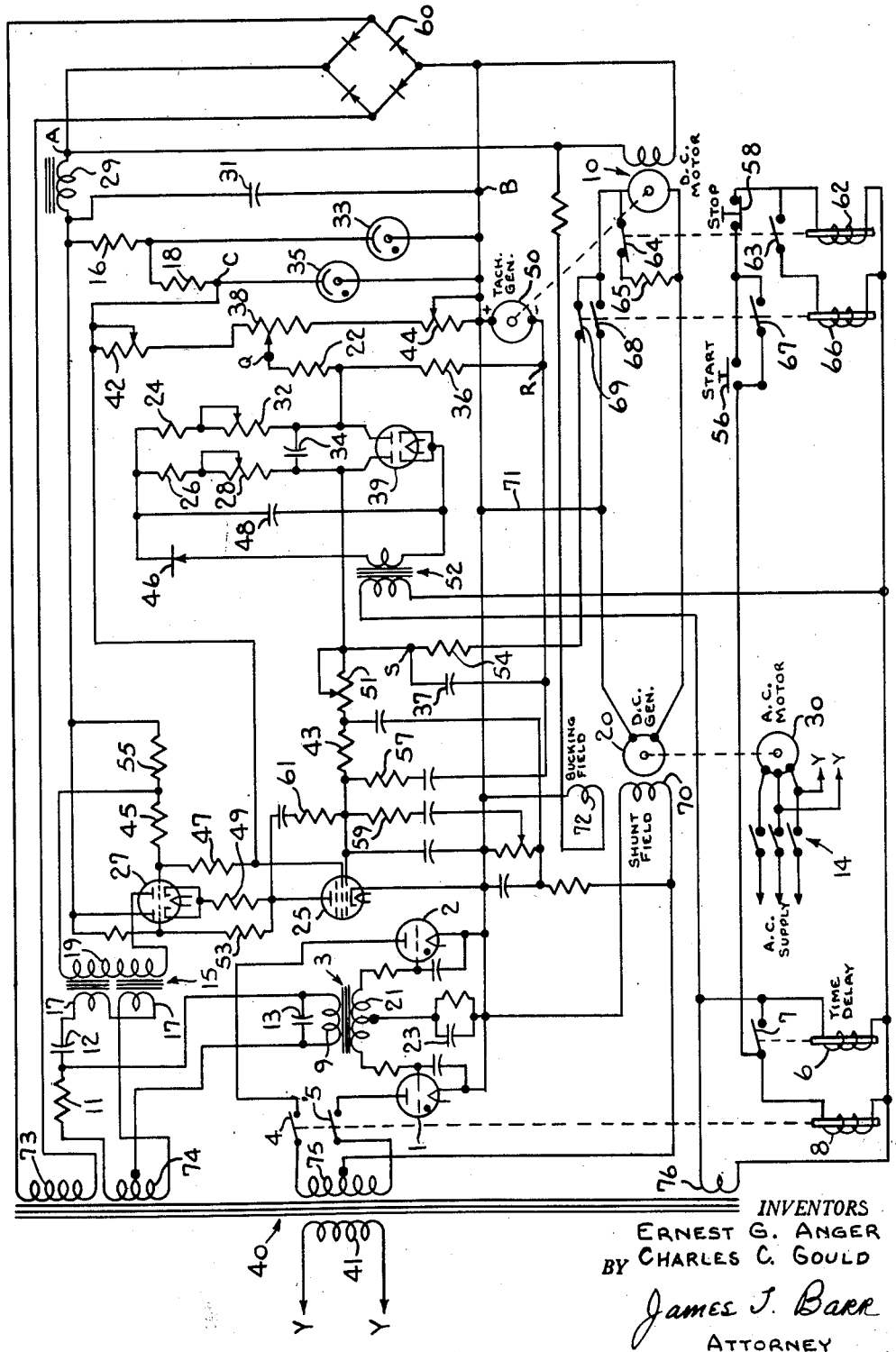
INVENTORS
ERNEST G. ANGER
BY CHARLES C. GOULD
James J. Barr
ATTORNEY United States Patent Office 2,786,975
Patented Mar. 26, 1957

2,786,975

MOTOR CONTROL SYSTEMS

Ernest G. Anger, Wauwatosa, and Charles C. Gould, Brookfield, Wis., assignors to Square D Company, Detroit, Mich., a corporation of Michigan Application November 2, 1954, Serial No. 466,302

13 Claims. (Cl. 318—146)

This invention concerns a novel electronic control circuit providing for the adjustment and regulation of speed of a direct current motor, by control of the excitation supplied to a motor generator set supplying said motor, whereby speed changes of said motor are referred back to change the excitation voltage to the generator and restore the pre-set speed of said motor.

One of the objects of this invention is to provide an improved electronic controller for a direct current motor fed from a motor-generator set utilizing tachometer feedback to vary the excitation to the generator to obtain regulating correction of error in the motor speed.

Another object of this invention is to provide a controller for a direct current motor having electronic time-rate circuits for acceleration and deceleration control of the motor of simpler and more economic form.

A still further object of the invention is to provide an electronic control circuit for a direct current motor in which fail safe features of the electronic tubes are incorporated. Conventional methods of coupling between electronic tubes, where common plate supply is used, involves coupling the plate of one tube to the grid of the next tube, and this introduces a phase reversal. If the conduction of the second tube is arranged to increase motor power, the first tube must be connected so that it "turns on" to cut the second tube off. If it fails, the second tube turns full on out of control and the generator to which it provides excitation voltage may cause the motor to race to a dangerous speed and condition. Reversing the function does not help, since the second tube will then become the "fail unsafe" element. Therefore, this invention is designed, as will be more particularly pointed out in the following specification, to safeguard this condition and provide "fail safe" operation of the electronic tubes.

A still further object of the invention is to provide an electronic controller for a direct current motor providing for smooth starting of the system, wherein regulation of the generator voltage output to a low value is maintained while the drive is stopped to keep the regulator at its operating point.

A still further object of the invention is to provide an electronic controller for a direct current motor fed from a motor-generator set in which regulation of the generator voltage is normally effected from the motor speed and in which interruption of the drive changes the regulation to the voltage difference between the generator and the motor.

These and further objects and features of the invention will be readily apparent to those skilled in the art from the specification and appended drawing illustrating certain preferred embodiments in which the figure is a diagrammatic representation of the control circuit of the present invention.

In the description of the circuit, it will be noted that numerical designation of certain conventional elements such as tube filaments, surge by-pass capacitors, etc., have been omitted to simplify the explanation of the circuit and its operation. These elements are well known to those skilled in the art, and the value of such components and their disposition will be obvious.

The circuit shown consists of an electronic regulator exciter which operates as part of the adjustable voltage controller to provide adjustment and regulation of speed of a direct current motor 10 by control of the excitation supplied to the direct current generator 20, which in turn, is directly coupled to and driven by an alternating current motor 30. As shown, the motor 30 is connected to a three phase line from a convenient A. C. power source, controlled by a three pole switch 14 of conventional type, which may be manually or otherwise operated, and which also operates to complete the circuit to the primary 41 of the main transformer 40.

The main transformer 40 has a secondary 73, a center-tapped secondary 74, a center-tapped secondary 75 and a secondary 76, which provide the necessary alternating current power to the circuit.

The circuit will be described first from the standpoint of related circuit portions and later from an operational standpoint as a whole, with the various switches shown in their static positions during the stop portion of the operating cycle.

The electronic exciter portion of the circuit includes grid controlled thyratron rectifier tubes 1 and 2 and associated grid transformer 3. Anode power for the tubes 1 and 2 and 110 v. power for the control circuit are furnished by secondary 75 of transformer 40, which in turn is controlled by relay contacts 4 and 5. Contacts 4 and 5 prevent application of voltage to the tube anodes when the control circuit is initially energized, until a time delay relay 6 closes its contacts 7, which energizes relay 8 to close contacts 4 and 5. The grid transformer 3 has its primary 9 connected between a mid-tap of secondary 74 and the junction of resistor 11 and capacitor 12. A phase shift saturable reactor 15 has alternating current windings 17 and a direct current winding 19, which operate in a well known manner to translate a D. C. signal thru the saturating winding 19 into an A. C. response in the secondary 17, which is further reflected across the grids of tubes 1 and 2. With the saturable reactor 15 unsaturated, due to lack of current in its D. C. winding 19, so as to present high reactance, the primary 9 of grid transformer 3 is energized through load resistor 11 from the secondary 74. The secondary windings 21 of the transformer 3 then apply voltages to the grids of tubes 1 and 2 which are opposite in polarity to their respective anode voltages and thereby prevent them from firing. The phase retard capacitor 13 compensates for unsaturated current of the reactor 15 to insure full phase-back and cut-off conduction at the grid of tubes 1 and 2. A negative D. C. bias charge conducted into grid bias capacitor 23 by grid rectification also helps to prevent conduction, by decreasing the portion of the cycle that each grid is positive. A capacitor 12, having a value to resonate with the saturated condition of the saturable reactor, facilitates extreme advance in phase shift in response to D. C. saturating current. The above elements make up the major components of the electronic exciter portion of the circuit.

The regulated speed reference portion of the circuit will now be described. A rectifier 60 is shown connected across the secondary 73 of transformer 40 and serves to provide D. C. voltage across the points A and B, and to supply a stable D. C. voltage to the field winding of motor 10 and to the bucking field 72 of generator 20. Anode voltage for the regulating tubes 25 and 27 is drawn from the rectifier 60 thru the reference filter reactor 29. The filter reactor 29 and reference filter capacitor 31 provide a filter network for the D. C. output of rectifier 60 to remove vestigial A. C. components in a manner well known in the art. The glow tubes 33 and 35 are used as regulating tubes and are connected in cascade to provide close regulation of the output voltage of rectifier 60 between points C and B. Thus tube 35 will retain the regulated voltage output of tube 33 at a greater regulatory amount and holds close voltage regulation across the points C and B, and therefore across speed adjustment resistors 38, 42 and 44. The potential and setting of the slider of the potentiometer 38 furnishes an adjustable speed reference voltage in a manner to be further described. Rheostats 42 and 44 permit adjustment of the maximum and minimum voltage, respectively, of the reference voltage available. The regulated reference voltage is fed thru the slider of potentiometer 38 to a voltage or comparison divider network.

The comparison divider circuit comprises resistors 22 and 36 and takes the voltage between the adjustable positive potential of the slider of rheostat 38 at point Q, and the negative output of the tachometer generator 50 at point R. The divider ratio is such that their common junction will furnish a slightly negative grid voltage to the error amplifier tube 25 when the speed of motor 10 is properly regulated. A deviation in speed of motor 10 and consequent change in tachometer 50 output then swings this voltage to increase or decrease the amplifier input, until the resulting change in tachometer feedback again restores the balance. The tachometer generator 50 is mechanically coupled to and driven by the motor 10 so that its electrical output is an accurate reflection of the speed of motor 10. The error voltage represents the difference between the applied speed reference voltage and the output of tachometer generator 50, which accurately reflects the variation in the speed of motor 10 from its pre-set or regulated speed.

A change of setting of speed set potentiometer 38 will similarly swing the divider voltage to obtain regulated speed changes at any desired value. The tachometer output then seeks a new value to restore the balance, and thereafter regulation is effected in accordance with the new selected setting.

The circuit for time rate acceleration and deceleration consists of a time rate capacitor 37 and a circuit employing adjustable resistors 28 and 32, which limit respectively the charge or discharge current of the capacitor. An auxiliary source of D. C. voltage, consisting of transformer 52, rectifier 46, and filter capacitor 48, provides additional voltage to sustain the rate of charging current flow. Diode sections of tube 39 bypass the charge and discharge currents during steady running conditions. A discharge resistor 54 and switch 69 provide initial discharge of capacitor 37 and the initial regulation function which will be subsequently explained. The capacitor 37 which is connected between the negative tachometer terminal, or point R, and an intermediate point S in the resistor network is disposed so as to intercept transmission of the error signal from the comparison divider to the grid of amplifier tube 25.

The voltage at the point S and also the grid of tube 25 with respect to its cathode is at all times about −1½ volts, the normal bias of tube 25. Any deviation from this voltage results in a strong correcting change in speed and tachometer signal to restore this condition. Capacitor 37, therefore, maintains a charge about 1½ volts less than the tachometer 50 output which must be changed in order to permit the regulator to control a change in speed. The rate of speed change, therefore, is controlled by the rate at which capacitor 37 can charge or discharge thru the resistors 28 and 32. The positive terminal of capacitor 37 connects to the comparison divider circuit heretofore described, thru the charge limiting tube 39. Therefore, adjustable pre-set currents flowing through the acceleration adjustment rheostat 28 and deceleration adjustment rheostat 32 from rectifier 46 are normally by-passed back to this source by the conduction of the diode sections of tube 39. Since the currents are low, the tube anodes conduct with negligible voltage drop facilitated by the filtering action of capacitor 34 and consequently are nearly the same potential in normal operation. They thus are effectively tied together, by their conductions to the same cathode.

If the setting of the speed set potentiometer 38 is suddenly increased or decreased, one of the diode sections of tube 39 blocks as it attempts to carry reverse current, and its cathode is carried positive or its anode negative, as the case may be. The charge or discharge current to capacitor 37 is then limited to the current carried by the acceleration or deceleration rheostats 28 and 32, whichever is in the circuit to the blocked anode. Capacitor 37 then charges or discharge at substantially uniform rates pre-set by the respective adjuster. As it does so, the regulator controls the speed to keep tachometer 50 output following and matching the capacitor 37 voltage. When capacitor 37 has charged or discharged to the new voltage drop across resistor 36, as the tachometer 50 varies its output, the blocked anode of tube 39 again conducts, bypassing the charging current and preventing further change.

The error amplifier circuit will now be described. The signal from the comparison divider and the time rate circuit is transmitted to the grid of amplifier tube 25 through a stability adjusting rheostat 51 and a grid resistor 43. The amplifier tubes 25 and 27 form a two stage amplifier, controlling the D. C. saturation of reactor 15 in response to the grid signal voltage received. The pentode amplifier tube 25 operates in a conventional manner as the first stage of amplification, but its connection to duo-triode amplifier tube 27 is such that "fail safe" features are obtained, the duo-triode tube 27 being connected in series with the anode circuit of tube 25. This may be further described as follows: the left hand triode section of tube 27 operates in the "reverse" sense which could permit speed rise if it failed to conduct. However, its supply is received through the amplifier tube 25, which operates in the correct (forward) sense and can take over full control. Only a slight rise in speed would result as tube 25 drew the necessary grid signal to accomplish this. The right hand section of tube 27 and also the thyratron tubes 1 and 2 operate in the forward "fail safe" sense.

The two triode sections of tube 27 operate in combination as a current amplifier. Before conduction of tube 25 is increased by reduction of its negative grid bias (−1.5 v.), its current flows initially through the "dummy" left hand section of tube 27, while the section controlling the reactor 15 remains blocked off by the relative grid voltages applied. As the current increases and the cathode of tube 25 drops in potential, to approach the potential of the resistor 45 and resistor 47 junction, the right hand triode section controlling the saturable reactor 15 begins to conduct, preventing further drop in potential. A small further increase in conduction of tube 25 then causes an accelerated change in the drop across the resistor 49 which is transmitted as a negative signal to the grid of the "dummy" left hand section which cuts off, its current transferring to the active section which controls reactor 15 saturation. In this region of operation a small change in anode current of tube 25 causes an amplified increase in output current to the reactor 15. The amplified output from A. C. windings 17 of reactor 15 is transmitted to the control grids of thyratron rectifiers 1 and 2 by means of the grid transformer 3. As the A. C. output of windings 17 increases, the grid voltage waves advance in phase causing the tubes 1 and 2 to fire progressively earlier in their positive anode cycles and thus conduct increased rectifier current into the generator field to increase the generator's output voltage.

The following is a description of the starting and stopping circuit. As shown, the secondary 76 of transformer 40 provides a power supply for the start and stop circuit. The start and stop circuit has a manually operated start button 56, shown in the normally open position and a manually operated stop button 58, shown in the normally closed position. As shown, the start and stop circuit is de-energized because the time delay switch 7 is in the open position and this switch controls energization to the start relay coil 8 and to the remainder of the start and stop circuit. As previously described, the closure of supply switch 14 energizes the transformer 40 and develops a static condition of the circuit preparatory to the starting of the drive system. Under the static condition, the secondary 76 energizes the time delay relay coil 6 and after a timed interval will close contacts energizing anode relay coil 3 which closes contacts 4 and 5 to prepare the exciter circuit, by providing anode voltage to the tubes 1 and 2. With the closure of switch 7, the start and stop circuit, though still in the open position, is prepared for subsequent manual operation. Upon manual actuation of the start button 56 a circuit is completed from the transformer secondary 76 through contacts 7 through the start button 56, stop button 58 to a dynamic breaking relay coil 62, and back to the transformer secondary 76. The energization of relay coil 62 closes its normally open contact 63 and opens its normally closed contacts 64 to accomplish the following switching functions: the opening of contacts 64 opens the circuit to a dynamic braking resistor 65 which operates in a well known manner to furnish dynamic braking for the motor 10 when stopped by operation of the stop button; and the closure of contacts 63 completes the circuit to the main starting relay coil 66 which operates its corresponding contacts in the following manner. Normally open contacts 67 are closed upon energization of relay coil 66 to provide a holding circuit around the start button 56 to maintain continued operation of the system after release of starting button 56 which then returns to its open position. The energization of relay coil 66 also operates to close a normally open main starting switch 68 to connect the output of generator 20 to the armature of motor 10. In addition the energization of relay coil 66 opens a normally closed switch 69. The switch 69 in its normally closed position has completed a circuit to the discharge resistor 54 permitting the capacitor 37 to discharge during the stopping period and to provide a circuit for initial regulation of the generator 20 field energization as will be subsequently described.

The running operation of the circuit will now be described. Upon closure of the supply switch 14, both the transformer 40 (connections Y—Y) and the A. C. motor 30 are energized. This operation precedes the manual start operation induced by the operator. In this initial position the static condition of the circuit heretofore described develops a condition as follows: a small voltage is induced by the residual magnetism of the generator 20 which is directly coupled to and driven by the motor 30 and therefore applies a small reference voltage across the grid of tube 27, this voltage being insufficient to provide conduction of said tube because of the bucking coil 72 of generator 20. However, with energization of secondary 76 and subsequent closure of the time delay contacts 7, the relay 3 will close its corresponding contacts 4 and 5 to provide plate or anode voltage for the electronic tubes 1 and 2. This action starts the operation of the electronic circuit to permit warm-up of the various tubes to create a preparatory condition for subsequent operation upon starting of the system and the application of the grid voltages in excess of the grid bias voltages of the various tubes. The delay time interval thus permits the system to warm-up and enable it to function smoothly upon closure of the start button 56. During this initial static period, the D. C. motor 10 is de-energized because the start contacts 68 remains in the open position. With manual actuation of the start button 56 the static condition is removed and the running portion of the cycle is initiated. This action places the motor 10 under the control of the generator 20 enabling starting of the drive system. A feature of this circuit is the arrangement for switching the grid of amplifier tube 25 to the armature circuit of motor 10 during idle periods. In order to obtain smooth increase of conduction of the amplifier tubes for starting of the motor 10 to have the regulating circuit at an operating point it is desirable to operate the circuit by operating it as a generator armature voltage regulator initially. This gives the regulating circuit something to regulate to initially while the various capacitors employed in the stabilizing circuits charge to their proper voltages. With the contacts, heretofore described, in their operating positions the motor 10 will then start accelerating to its pre-set running speed without an undesirable initial surge of current. Before motor operation, regulation is provided through conductor 71 from the reference line to the armature of generator 20 and through resistor 54, contacts 69 and the armature of motor 10. This permits the amplifier to regulate the generator output by its control over field excitation to the small initial negative value required for normal operating bias of tube 25. The negative excitation supplied to the generator by the bucking field winding 72 facilitates operation at low output by cancellation of the normal residual magnetism of the generator iron. Therefore, the electronic exciter circuit heretofore described operates as a generator voltage regulator initially when contacts 69 are closed and 68 open in the motor circuit. When switch 68 closes to apply the generator power to the motor, the output of the tachometer generator and of the time rate circuit then become effective in obtaining prompt and smooth motor acceleration. This was found desirable due to the sensitivity of the amplifier circuit, which can permit complete turn-off and turn-on of the generator field as a result of a fraction of a volt change on the grid of the amplifier tube. The latter is a desirable feature during running conditions because it provides close regulation but during starting presents the difficulties described.

The connection of switch 69 as shown, so as to include both generator and motor armature voltages, provides regulation to the difference between these voltages, rather than generator voltage alone. This feature becomes effective if the drive is re-started before the motor has come to a complete stop, since it is then desirable that the generator voltage be substantially equal to the counter voltage of the motor rather than an independent low value to prevent heavy reverse current surge. With the circuit shown the generator voltage therefore is regulated to follow the motor voltage down, to permit safe re-start at any time.

During the running operation, changes in the load are communicated to the motor 10 as changes in motor speed. Correction of this speed, back to the desired pre-set speed is the prime function of the control system. Therefore the tachometer generator 50 is mechanically coupled to the motor 10 and reflects the actual motor speed in its electrical output across the points R and B. Therefore, any change in speed of motor 10 will be reflected in a corresponding change in voltage across the points R and B. Such change is then fed to the divider circuit in comparison to the heretofore existing reference voltage. The error voltage, i. e., the difference between the imposed voltage and the tachometer voltage, is then fed through tube 39, which normally bypasses the time rate acceleration circuit during operation at constant settings of the speed potentiometer 38. A change of tachometer voltage is also transmitted to some extent directly through time rate capacitor 37. The combined error voltage signal is then transmitted to the grid of amplifier tube 25 where it is amplified and transmitted to the tube 27, where it is further amplified and transmitted to the reactor 15. The reactor 15 provides conversion of the amplified voltage change to a change in phase of the A. C. grid voltages applied to thyratron tubes 1 and 2 which consequently vary their output to the generator shunt field 70. The error voltage signal thus operates to change the output of generator 20 to substantially correct the speed of motor 10 back to the pre-set speed position.

As an example of but one group of components useful in the control circuit of the invention, the components shown in the figure may have the following characteristics:

Resistors: (In ohms)

| | | |
|---|---|---|
| 11 | 24 K. | 1 w. |
| 16 | 1600 | 10 w. |
| 18 | 4 K. | 10 w. |
| 22 | 100 K. | 1 w. |
| 24 | 240 K. | 1 w. |
| 26 | 240 K. | 1 w. |
| 36 | 120 K. | 1 w. |
| 43 | 750 K. | 1 w. |
| 45 | 75 K. | 1 w. |
| 47 | 13 K. | 1 w. |
| 49 | 47 K. | 1 w. |
| 51 | 75 K. | 1 w. |
| 53 | 30 K. | 1 w. |
| 54 | 10 K. | 1 w. |
| 55 | 12 K. | 1 w. |
| 57 | 510 K. | 1 w. |
| 59 | 3 M. | 1 w. |
| 61 | 120 K. | 1 w. |
| 65 | 12.8 K. | 500 w. |

Capacitors: (In mfd.)

| | | |
|---|---|---|
| 12 | .5 | 600 v. D. C. |
| 13 | .1 | 600 v. D. C. |
| 23 | .5 | 600 v. D. C. |
| 31 | 16 | 450 v. |
| 34 | .5 | 600 v. D. C. |
| 37 | 4 | 200 v. |
| 48 | .5 | 600 v. D. C. |

In the diagram various combinations of capacitors and resistors are shown with connections to the grid of tube 25. These are desirable for stabilization of the regulation as a result of the high amplification provided and because of the delays inherent in the amplifier circuits and generator field. They operate in a conventional manner understandable to those skilled in the art but have no bearing on the features described in this invention.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A motor control system comprising a direct current motor, a direct current generator having its output connected to the armature of said motor, means including means responsive to the speed of said motor supplying a signal voltage varying in accordance with the variation of the speed of the motor from a preset value, an electronic amplifier tube having its grid responsive to the signal voltage so that its output amplifies the signal, a pair of grid controlled electronic circuits having their cathodes fed from the output of said electronic tube, a load circuit connected to one of said electronic circuits, control means connected to the other of said electronic circuits, means for varying the proportional division of the output of said electronic tube between said electronic circuits as the output of said electronic tube varies whereby to secure an amplification of the output of said electronic tube in the control circuit fed by said other of said electronic circuits, and means operated by said control means for varying the energization of said generator in a sense to return the motor to its preset speed.

2. A motor control system comprising a direct current motor, a direct current generator having its output connected to the armature of said motor, means including means responsive to the speed of said motor supplying a signal voltage varying in accordance with variation of the speed of the motor from a preset value, an electronic amplifier tube having its grid responsive to the signal voltage so that its output amplifies the signal, a pair of grid controlled electronic circuits having their cathodes fed from the output of said electronic tube, a load circuit connected to one of said electronic circuits, control means connected to the other of said electronic circuits, means for varying the proportional division of the output of said electronic tube between said electronic circuits as the output of said electronic tube varies whereby to secure an amplification of the output of said electronic tube in the control circuit fed by said other of said electronic circuits, and means operated by said control means for varying the energization of said generator in a sense to correct said signal by returning the motor to its preset speed, said means for varying the proportional division of currents between said electronic circuits operating to increase the current through said control means upon increase in output of said electronic tube, said control means upon increase in current fed thereto operating to increase the energization of said generator, whereby failure of any one or all of said electronic tube and electronic circuits will not permit the generator energization and motor speed to increase uncontrolled.

3. A motor control system comprising a direct current motor, a direct current generator having its output connected to the armature of said motor, means including means responsive to the speed of said motor supplying a signal voltage varying in accordance with variation of the speed of the motor from a preset value, an electronic amplifier tube having its grid responsive to the signal voltage so that its output amplifies the signal, a pair of grid controlled electronic circuits having their cathodes fed from the output of said electronic tube, a load circuit connected to one of said electronic circuits, a saturable reactor having alternating current windings and a saturating direct current winding, means connecting said saturating winding to the output of the other of said electronic circuits, means for varying the proportional division of the output current of said electronic tube between said electronic circuits upon change in the value of the output of said electronic tube, a phase shift circuit including the alternating current windings of said saturable reactor, and an electronic energization circuit for said generator having its output controlled by said phase shift circuit and operating to vary the generator excitation in a sense to correct said signal by returning the motor to its preset speed.

4. A motor control system comprising a direct current motor, a direct current generator having its output connected to the armature of said motor, means including means responsive to the speed of said motor supplying a signal voltage varying in accordance with variation of the speed of the motor from a preset value, an electronic amplifier tube having its grid responsive to the signal voltage so that its output amplifies the signal, a pair of grid controlled electronic circuits having their cathodes fed from the output of said electronic tube, a load circuit connected to one of said electronic circuits, a saturable reactor having alternating current windings and a saturating direct current winding, means connecting said saturating winding to the output of the other of said electronic circuits, means for varying the proportional division of the output current of said electronic tube between said electronic circuits upon change in the value of the output of said electronic tube, a phase shift circuit including the alternating current windings of said saturable reactor, and an electronic energization circuit for said generator having its output controlled by said phase shift circuit and operating to vary the generator excitation in a sense to correct said signal by returning the motor to its preset speed, said means for varying the proportional division of currents between said electronic circuits operating to increase the current through said saturating winding upon increase in output of said electronic tube, said reactor upon increase in saturation operating to increase the energization of said generator, whereby failure of any one or all of said electronic tube and electronic circuits will not permit generator energization and motor speed to increase uncontrolled.

5. A motor control system comprising a direct current motor, a direct current generator having its output connected to the armature of said motor, means including means responsive to the speed of said motor supplying a signal voltage varying in accordance with the variation of the speed of the motor from a preset value, an electronic amplifier tube having its grid responsive to the signal voltage so that its output amplifies the signal, a pair of grid controlled electronic circuits having their cathodes fed from the output of said electronic tube, a load circuit connected to one of said electronic circuits, control means connected to the other of said electronic circuits, means biasing the grids of said electronic circuits and by their relative values determining the division of the output of said electronic tube between said electronic circuits, means for changing the relative value of grid voltages of said electronic circuits upon change in output of said electronic tube so as to change the proportional division of the output of said electronic tube between said electronic circuits to secure in said control means an amplification of the output of said first electronic tube, and means operated by said control means for varying the energization of said generator in a sense to correct said signal by returning the motor to its preset speed.

6. A motor control system comprising a direct current motor, a direct current generator having its output connected to the armature of said motor, means including means responsive to the speed of said motor supplying a signal voltage varying in accordance with variation of the speed of the motor from a preset value, an electronic amplifier tube having its grid responsive to the signal voltage so that its output amplifies the signal, a pair of grid controlled electronic circuits having their cathodes fed from the output of said electronic tube, a load circuit connected to one of said electronic circuits, control means connected to the other of said electronic circuits, means biasing the grids of said electronic circuits and by their relative values determining the division of the output of said electronic tube between said electronic circuits, means for changing the relative value of grid voltages of said electronic circuits upon change in output of said electronic tube so as to change the proportional division of the output of said electronic tube between said electronic circuits to secure in said control means an amplification of the output of said electronic tube, and means operated by said control means for varying the energization of said generator in a sense to correct said signal by returning the motor to its preset speed, said means for varying proportional division of currents between said electronic circuits operating to increase the current to said control means upon increase in output of said electronic tube, said control means upon increase in current fed thereto operating to increase the energization of said generator whereby failure of any one or all of said electronic tube and electronic circuits will not permit generator energization and motor speed to increase uncontrolled.

7. A motor control system comprising a direct current motor, a direct current generator having its output connected to the output of said motor, a tachometer generator supplying a voltage proportional to the speed of said motor, means supplying a reference voltage, means for comparing said tachometer generator voltage and said reference voltage to secure a signal voltage representing the difference therebetween, a first electronic amplifier tube having its grid responsive to said signal voltage so that its output amplifies the signal, an electronic tube having a pair of parallel circuits therethrough including a cathode and an anode and a control grid therefor, means for feeding said cathodes from the output of said first electronic tube, a load circuit connected to one of said anodes, a saturable reactor having alternating current output windings and a direct current saturating winding, means connecting said saturating winding to the other of said anodes, means biasing said control electrodes to determine the division of the output of said first electronic tube between said parallel circuits, means for varying the relative value of said control electrode biases upon change in output of said first electronic tube so as to secure an amplification of said output in said saturating winding, a phase shift circuit including the alternating current windings of said saturable reactor, and electronic energizing means controlled by said phase shift circuit and varying the energization of said generator in response to variation in motor speed from a preset value in a sense to effect return thereto.

8. A motor control system comprising a direct current motor, a direct current generator having its output connected to the output of said motor, a tachometer generator supplying a voltage proportional to the speed of said motor, means supplying a reference voltage, means for comparing said tachometer generator voltage and said reference voltage to secure a signal voltage representing the difference therebetween, a first electronic amplifier tube having its grid responsive to said signal voltage so that its output amplifies the signal, an electronic tube having a pair of parallel circuits therethrough each including a cathode and an anode and a control grid therefor, means for feeding said cathodes from the output of said first electronic tube, a load circuit connected to one of said anodes, a saturable reactor having alternating current output windings and a direct current saturating winding, means connecting said saturating winding to the other of said anodes, means biasing said control electrodes to determine the division of the output of said first electronic tube between said parallel circuits, means for varying the relative value of said control electrode biases upon change in output of said first electronic tube so as to secure an amplification of said output in said saturating winding, a phase shift circuit including said alternating current winding of said saturable reactor, and electronic energizing means controlled by said phase shift circuit and varying the energization of said generator in response to variation in motor speed from a preset value in a sense to effect return thereto, the electronic circuit feeding the direct current winding of the saturable reactor being biased so as to increase the saturation of the reactor and energization of the generator upon increase in the output of said first electronic tube and said first electronic tube being biased to increase its output upon decrease in speed of said motor whereby failure of either of said electronic tubes will not permit the generator energization and motor speed to increase uncontrolled.

9. A motor control system comprising a direct current motor, a direct current generator having its output connected to the armature of said motor, means including means responsive to the speed of said motor supplying a signal voltage varying in accordance with variation of the speed of the motor from a preset value, an electronic amplifier tube having its grid responsive to the signal voltage so that its output amplifies the signal, a pair of grid controlled electronic circuits having their cathodes fed from the output of said electronic tube, a load circuit connected to one of said electronic circuits, control means connected to the other of said electronic circuits, means for varying the proportional division of the output of said electronic tube between said electronic circuits as the output of said electronic tube varies whereby to secure an amplification of the output of said electronic tube in the control circuit fed by said other of said electronic circuits, means operated by said control means for varying the energization of said generator in a sense to return the motor to its preset speed, and means operating upon disconnection of said generator output from said motor for transferring the grid control of said electronic tube to a function of the generator output voltage so as to maintain operation of the amplification circuit while the motor is disconnected.

10. A motor control system comprising a direct current motor, a direct current generator having its output connected to the armature of said motor, means including means responsive to the speed of said motor supplying a signal voltage varying in accordance with variation of the speed of the motor from a preset value, means for regulating the energization of said generator in accordance with the value of said signal voltage, and means operating upon disconnection of said generator output from said motor for transferring the control of said regulating means to the generator output voltage so as to maintain operation of said regulating means while motor energization is discontinued.

11. A motor control system comprising a direct current motor, a direct current generator having its output connected to the armature of said motor, means including means responsive to the speed of said motor supplying a signal voltage varying in accordance with variation of the speed of the motor from a preset value, means regulating the energization of said generator in accordance with the value of said signal voltage, and means operating upon disconnection of said generator output from said motor for transferring the control of said regulating means to a second signal voltage representing the difference between the generator output voltage and the counter-voltage of the motor whereby the generator output voltage is regulated to follow the motor counter-voltage down as the motor decelerates to a stop.

12. A motor control system comprising a direct current motor, a direct current generator having its output connected to the armature of said motor, means including means responsive to the speed of said motor supplying a signal voltage varying in accordance with variation of the speed of the motor from a preset value, means for amplifying said signal, control means fed by said amplifying means, means controlled by said control means for varying the energization of said generator in accordance with the value of said signal voltage and means operating upon disconnection of said generator output from said motor for substituting for said signal voltage a voltage representing a function of the generator output voltage so as to maintain operation of said amplifying means while motor energization is discontinued.

13. A motor control system comprising a direct current motor, a direct current generator having its output connected to the armature of said motor, means including means responsive to the speed of said motor supplying a signal voltage varying in accordance with variation of the speed of the motor from a preset value, means for amplifying said signal, control means fed by said amplifying means, means controlled by said control means for varying the energization of said generator in accordance with the value of said signal voltage and means operating upon disconnection of said generator output from said motor for substituting for said signal voltage a voltage representing the difference between the generator output voltage and the motor counter-voltage whereby the generator output voltage is regulated to follow the motor counter-voltage down as the motor decelerates to a stop.

References Cited in the file of this patent

UNITED STATES PATENTS 2,519,339    Avery  ---------------- Aug. 22, 1950

FOREIGN PATENTS 678,835    Great Britain ---------- Sept. 10, 1952